US007111247B2

(12) United States Patent
Choi et al.

(10) Patent No.: US 7,111,247 B2
(45) Date of Patent: Sep. 19, 2006

(54) DEVICE AND METHOD FOR CONTROLLING MENU DISPLAY OF MICROWAVE OVEN

(75) Inventors: Kyung-Hwan Choi, Changwon Gyeongnam (KR); Won-Kyung Park, Masan Gyeongnam (KR)

(73) Assignee: LG Electronics Inc., Seoul (KR)

( * ) Notice: Subject to any disclaimer, the term of this patent is extended or adjusted under 35 U.S.C. 154(b) by 642 days.

(21) Appl. No.: 10/146,060

(22) Filed: May 16, 2002

(65) Prior Publication Data

US 2003/0001902 A1 Jan. 2, 2003

(30) Foreign Application Priority Data

Jul. 2, 2001 (KR) .............................. 2001-39345
Jul. 2, 2001 (KR) .............................. 2001-39346

(51) Int. Cl.
*G06F 17/00* (2006.01)
*H05B 6/68* (2006.01)

(52) U.S. Cl. ...................... 715/810; 715/771; 715/866; 219/720; 219/714

(58) Field of Classification Search ................ 715/771, 715/778, 781, 765, 806, 864, 810, 866; 219/720, 219/714, 506, 754
See application file for complete search history.

(56) References Cited

U.S. PATENT DOCUMENTS 4,679,137 A * 7/1987 Lane et al. ................... 700/83
4,841,125 A * 6/1989 Edamura .................... 219/506
4,933,527 A * 6/1990 Edamura .................... 219/714
5,274,209 A * 12/1993 Edamura .................... 219/714
5,981,915 A * 11/1999 Head .......................... 219/492
6,097,016 A * 8/2000 Hirata et al. ................ 219/720
6,580,442 B1 * 6/2003 Singh et al. ................ 715/840

FOREIGN PATENT DOCUMENTS

JP 1019940008527 9/1994

* cited by examiner

*Primary Examiner*—Tadesse Hailu
(74) *Attorney, Agent, or Firm*—Fleshner & Kim LLP.

(57) ABSTRACT

The present invention relates to a device and method for displaying various menus of a microwave oven onto one screen. In the present invention, the various menus can be displayed onto one screen by using a tree structure or window structure. To this end, display control data are stored such that the various menus can be displayed in the form of the tree structure or display window. These display control data are stored in a separately provided storage device. According to the present invention constructed as such, since the user can confirm the various functions of the microwave oven on the same screen at one time, there is an advantage in that trials and errors made when using the microwave oven can be minimized. In addition, since all the functions can be confirmed simultaneously, there are further advantages in that the time required for learning how to use the microwave oven is reduced and function selection can be conveniently made.

3 Claims, 4 Drawing Sheets

DEVICE AND METHOD FOR CONTROLLING MENU DISPLAY OF MICROWAVE OVEN

BACKGROUND OF THE INVENTION

1. Field of the Invention

The present invention relates to a device and method for controlling menu display of a microwave oven, and more particularly, to a device and method for controlling menu display of a microwave oven, wherein the display of the menus selected by a user is controlled so that sequential display processes of the selected menus can be easily confirmed in one screen.

2. Description of the Prior Art

A microwave oven is a cooking machine for cooking foodstuffs by using a heater and/or a magnetron as a heating source. Since the microwave oven performs cooking of the foodstuffs in a short time, it is effective in view of time required for cooking the foodstuffs, nutritive value of the cooked foodstuffs, energy efficiency, and the like. Thus, the microwave oven has been widely utilized more and more.

As shown in FIG. 1, in the microwave oven, a control panel 7 used for selecting various kinds of cooking menus and controlling the cooking is provided on a front portion thereof Further, the microwave oven is provided with a cooking chamber 1 in a cavity 5 where the foodstuffs are cooked. An electric equipment installation chamber is formed beside the cooking chamber 1.

Various kinds of electric equipment for constituting the microwave oven, particularly such as the magnetron for generating microwave, a cooling fan, and the like, are installed within the electric equipment installation chamber. On the front portion of the electric equipment installation chamber is installed the control panel 7 which comprises buttons 9 used for selecting various functions of the microwave oven and a display unit 11 used for displaying various information signals.

The display unit 11 is used for performing sequential display of the selected menus, display of current cooking status, and the like. Further, a control circuit board (not shown), which is used for inputting signals selected through the buttons 9 and outputting signals to be displayed onto the display unit 11, is installed at a rear side of the control panel 7.

Hereinafter, an operation of controlling the menu display in the conventional microwave oven will be explained.

FIG. 2 is a block diagram of a control section of the conventional microwave oven used for controlling the menu display of the microwave oven. The control section is installed in the control circuit board. As shown in the figure, the control section of the conventional microwave oven comprises a microcomputer 13 for performing various kinds of controls for and operations of the microwave oven, a power circuit 15 for supplying power to the microcomputer 13, and an oscillation circuit 17 for supplying reference clock pulses used when the microcomputer 13 executes various programs installed in the microcomputer.

In the microcomputer 13 are stored cooking algorithms for performing the cooking corresponding to various menus of the microwave oven, display algorithms for displaying sequences of the menus of the microwave oven, and various data required for controlling the microwave oven. In particular, display control data used for displaying various menus onto the display unit 11 according to a sequence shown in FIG. 3 are stored in the microcomputer 13 of the conventional microwave oven.

In addition, the control section of the microwave oven further comprises a key input circuit 23 which includes the buttons 9 on the control panel 7 and allows signals to be inputted when a user has selected the buttons 9 provided on the control panel 7 of the microwave oven, and the display unit 11 for notifying the user to confirm contents inputted through the key input circuit 23 and an operating state of the microwave oven. The display unit 11 is the same one as is provided in the control panel 7.

Furthermore, a relay control unit 19 controls various driven devices (for example, the magnetron, the cooling fan, the heater, an oven lamp, and the like) provided in the microwave oven.

The menu display in the conventional microwave oven constructed as such is carried out through the following operations.

FIG. 3 shows an operating procedure according to the menu display of the conventional microwave oven.

First, when the electric power is supplied to the microwave oven, a predetermined initial screen is displayed onto the display unit 11 under the control of the microcomputer 13. At this time, the user selects a predetermined button through the key input circuit 23 so that a main screen, which is used for selecting the menus of the microwave oven and corresponds to a first stage of FIG. 3, is displayed onto the display unit 11.

When the user has selected a button through the key input circuit 23, a predetermined signal is inputted into the microcomputer 13 according to the selected button. The microcomputer 13 decodes the inputted signal, and accordingly, causes the predetermined main screen to be displayed onto the display unit 11. By performing the above processes, the state shown in the first stage of FIG. 3 is displayed onto the display unit 11.

Next, the user selects a desired cooking menu on the main screen. A "manual cooking" menu selected by the user is highlighted darkly as compared with the other cooking menus so as to inform the user that the "manual cooking" menu has been selected in the first stage of FIG. 3. When the "manual cooking" menu is selected, the microcomputer 13 retrieves submenus of the selected "manual cooking" menu from data stored therein and causes the submenus to be displayed onto the display unit 11 after recognizing that the "manual cooking" menu has been selected. A display state at this stage is shown at a second stage of FIG. 3.

Then, the user selects another desired cooking menu again on a screen displayed at the second stage of FIG. 3. A "strong operation" menu selected by the user is highlighted darkly as compared with the other cooking menus so as to inform the user that the "strong operation" menu has been selected in the second stage of FIG. 3. When the "strong operation" menu is selected, the microcomputer 13 retrieves submenus of the selected "strong operation" menu from data stored therein and causes the submenus to be displayed onto the display unit 11 after recognizing that the "strong operation" menu has been selected. A display state at this stage is shown at a third stage of FIG. 3.

Thereafter, if a timer setting screen is displayed as the next stage, the user sets a cooking period of time. If the period setting process has been completed, all the processes related to the menu selection are finished and an information corresponding to the current cooking state is displayed onto the display unit 11 as shown in a fourth stage of FIG. 3.

According to the method of controlling the menu display in the conventional microwave oven, when selecting and setting the submenus of the cooking menus of the microwave oven, a previous display screen disappears from the display unit 11 and only a screen corresponding to a currently selected menu is displayed thereon. That is, whenever the user sequentially selects submenus of any arbitrary cooking menus in the microwave oven, a screen for previous selection disappears and only a screen corresponding to a currently selected stage of the menu is displayed.

Thus, according to the method of controlling the menu display in the conventional microwave oven, since only a newly and currently selected function or menu is displayed onto the display unit whenever the new function or menu has been selected, the user cannot confirm a previously selected function or menu. Therefore, if the user forgets the previously selected function or menu, there is a problem in that he/she should select the menu again from the beginning, which is cumbersome.

Further, if all the buttons for performing the various menus shown in FIG. 3 should be provided in the control panel 7, there is another problem in that the size and production costs of the control panel are increased and are burdens on the manufactures and consumers since the numerous buttons should be provided therein.

SUMMARY OF THE INVENTION

Therefore, an object of the present invention is to provide a device and method for controlling menu display of a microwave oven wherein the display of the menus selected by a user is controlled so that sequential display processes of the selected menus can be easily confirmed in one screen.

According to an aspect of the present invention for accomplishing the object of the present invention, there is provided a device for controlling menu display of a microwave oven, which comprises a display unit in which a plurality of display windows for displaying functions selected by a user can be displayed onto one screen thereof, a storage device on which data of the display windows sequentially displayed onto the display unit are stored, and a microcomputer by which the display windows corresponding to the function selected by the user are controlled to be displayed by controlling the display unit and the data of the storage device.

Preferably, the plurality of display windows, which are included in an arbitrary function and displayed in sequential setting processes, are displayed onto the display unit in the form of small display windows so that the windows can be displayed onto the one screen.

Preferably, data set during the sequential setting processes in the arbitrary function are further stored in the storage device.

According to another aspect of the present invention, there is provided a method for controlling menu display of a microwave oven, which comprises the steps of displaying sequentially a plurality of display windows according to an arbitrary function setting process onto one screen, confirming the display windows and setting arbitrary functions in the display windows, and storing data on the display windows sequentially displayed onto the display unit.

According to a further aspect of the present invention, there is a method for controlling menu display of a microwave oven, which comprises the steps of setting various cooking functions of the microwave oven in the form of a tree structure in which the menus are classified into higher and lower functions, forming the set higher and lower functions of the microwave oven into a tree structure which can be displayed onto one screen, and displaying the functions in the form of tree structure onto the one screen, and recognizing any one function selected from the displayed various functions, and performing the selected function.

Preferably, the step of performing the selected function comprises the steps of selecting an arbitrary one of functions included in the selected functions, providing an input screen used for inputting data if input of the data is required in the selected function, inputting the data based on the input screen, and operating the microwave oven according to the inputted data.

Preferably, in the step of inputting the data, an operating period of the microwave oven is inputted.

Preferably, in the step of displaying the functions, specific signs are used such that selected and unselected functions can be discriminated from each other.

Preferably, in the step of displaying the functions, only higher functions are displayed at an initial display state of the screen.

Preferably, in the step of displaying the functions, specific signs are used such that higher functions including lower functions and other higher functions not including lower functions can be discriminated from each other.

Preferably, in the step of displaying the functions, all the lower functions included in the selected function are displayed.

Preferably, in the step of displaying the functions, all the higher functions and the lower functions included in the selected higher function are displayed together.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Hereinafter, a device and method for controlling menu display in a microwave oven according to the present invention will be described in detail with reference the accompanying drawings.

Figure 1:
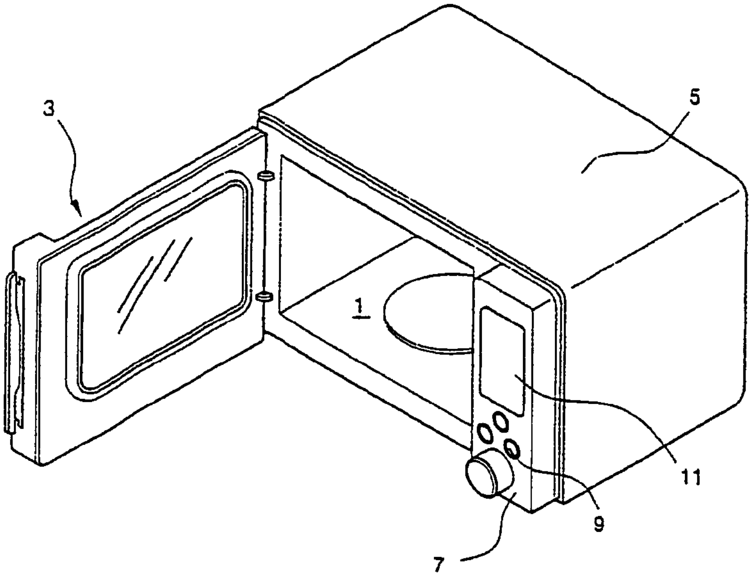
FIG.1 PRIOR ART
FIG. 1 is a perspective view of a conventional microwave oven.
Figure 2:
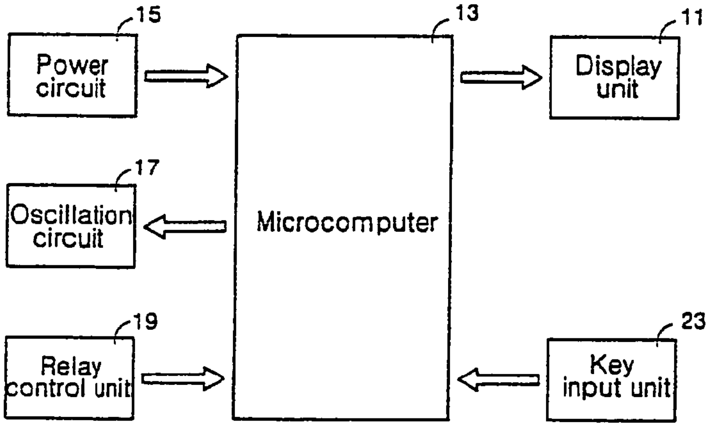
FIG.2 PRIOR ART
FIG. 2 is a block diagram of a control section for controlling menu display in the conventional microwave oven.
Figure 3:
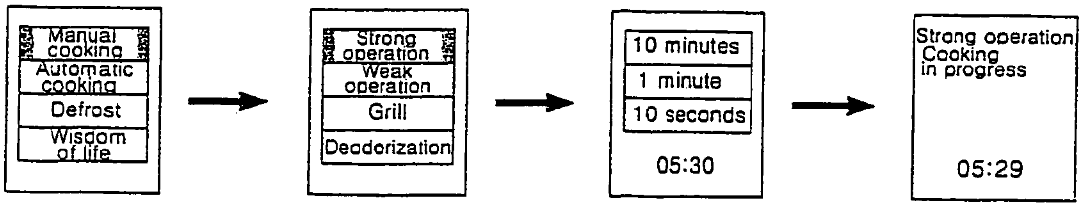
FIG.3 PRIOR ART
FIG. 3 is a view showing an operating procedure of the menu display in the conventional microwave oven.
Figure 4:
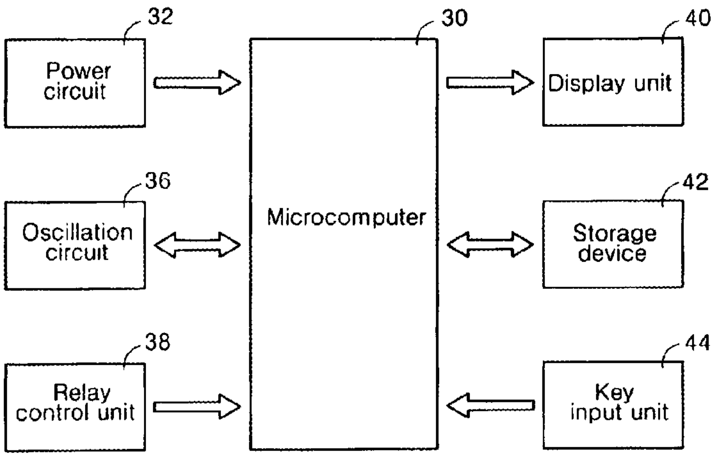
FIG. 4 is a block diagram of a control section for controlling menu display in a microwave oven according to the present invention.

FIG. 4 is a block diagram of a control section of the microwave oven for controlling the menu display in the microwave oven according to the present invention, and the control section of the microwave oven is provided in a control circuit board installed at a rear side of the control panel 7 shown in FIG. 1. As shown in the figure, the control section of the microwave oven according to the present invention comprises a microcomputer 30 for performing various kinds of controls for and operations of the microwave oven, a power circuit 32 for supplying power to the microcomputer 30, and an oscillation circuit 36 for supplying reference clock pulses used when the microcomputer 30 executes various programs installed in the microcomputer.

The control section of the microwave oven further comprises a key input circuit 44 which includes buttons 9 on the control panel 7 shown in FIG. 1 and allows relevant signals to be inputted when a user has selected the buttons 9 provided on the control panel 7 of the microwave oven, and the display unit 40 for notifying the user to confirm contents inputted through the key input circuit 44 and an operating state of the microwave oven. The display unit 40 is the same one as is provided in the control panel 7.

Furthermore, a relay control unit 38 is a component used for controlling various driven devices (for example, a magnetron, a cooling fan, a heater, an oven lamp, and the like) provided in the microwave oven.

A storage device 42 is a device which is separate from a storage unit provided in the microcomputer 30 and utilizes an element capable of recording and erasing data into and from the element. A RAM, a flash ROM, an external memory, and the like can be employed in the storage device 42.

In particular, according to a preferred embodiment of the present invention, data stored in the storage device 42 are controlled such that various cooking menus provided in the microwave oven can be displayed in the form of a tree structure. That is, by controlling the data stored in such a storage device, the cooking menus of the microwave oven can be divided into higher and lower functions or menus thereof so that they can be displayed onto only one screen as the tree structure. At this time, the stored data are controlled in such a manner that a plurality of the lower functions or menus capable of being included in a higher function or menu are displayed below the higher function and that the other higher functions can also be displayed on one screen together with the lower functions.

Further, according to another preferred embodiment of the present invention, data stored in the storage device 42 are controlled such that the various cooking menus provided in the microwave oven can be displayed by introducing a window function. That is, by controlling the data stored in such a storage device, the higher functions or menus of the cooking menus of the microwave oven can be displayed onto only one screen as one display window on which other cooking menus corresponding to the lower functions can be in turn displayed as another display window.

Next, processes of controlling the display of the cooking menus in the microwave oven constructed as such will be explained.

Figure 5:
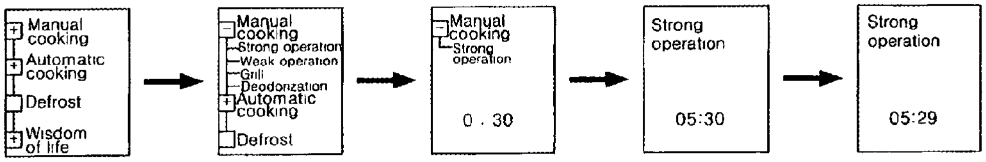
FIG. 5 is a view showing an operating procedure of the menu display in the microwave oven according to a first embodiment of the present invention.

FIG. 5 shows the sequential processes of controlling the menu display in the microwave oven according to a first embodiment of the present invention.

The processes of controlling the menu display in the microwave oven according to the first embodiment of the present invention are used to control the menu display in the form of the tree structure of the menus. Thus, the control data for controlling the menu display in the form of the tree structure should be stored in the storage device 42. Further, the key input circuit 44 are provided with a dial key and the like which are constructed to sequentially display the menus which may not be displayed due to a small size of the display screen even though all the menus may be displayed onto the one screen.

A process shown in a first stage of FIG. 5 illustrates a state of a main screen in the display unit of the microwave oven. The main screen is a first screen for various menus provided in the microwave oven. Thus, the menus corresponding to the highest level are displayed onto the main screen. For example, a "manual cooking" menu, an "automatic cooking" menu, a "defrost" menu, and the like are displayed onto the main screen.

The main screen is predetermined so that it is displayed by selecting any arbitrary buttons in an initial screen displayed onto the display unit 40 while the power is supplied to the microwave oven. Thus, when the user has selected any buttons provided on the key input circuit 44 so as to select a desired cooking menu, the microcomputer 30 recognizes that the state displayed onto the display unit 40 is an initial screen state, and allows the predetermined main screen to be displayed onto the display unit 40.

Next, a process shown in a second stage of FIG. 5 illustrates a state where the lower menus included in the "manual cooking" menu are displayed together with the other menus of the main screen when the "manual cooking" menu has been selected in the main screen state. The "manual cooking" menu includes a "strong operation" menu, a "weak operation" menu, a "grill" menu, a "deodorization" menu and the like as lower functions thereof The menu display is controlled such that when the user wishes to view menus in the main screen which are not displayed onto the display unit 40 in such a display state, the menus can be displayed by turning the dial key.

Further, a process shown in a third stage of FIG. 5 illustrates a state where the "strong operation" menu has been selected among the lower functions of the "manual cooking" menu. The "strong operation" menu is one of the menus corresponding to the lowest functions among all the menus. That is, if the "strong operation" menu has been selected, there are no further menu selection processes. Thus, a process of setting a cooking period of time which should be performed subsequently from this state is also displayed together.

Furthermore, after the process of setting the cooking period has been completed in the third stage of FIG. 5, a process of notifying the user to confirm the set period (five minutes and thirty seconds) and the selected cooking menu ("strong operation" menu) by displaying the period and the cooking menu onto the one screen is then displayed onto the display unit. This process is a state displayed in a fourth stage of FIG. 5.

Finally, a last stage of FIG. 5 corresponds to a state where a process of counting down the cooking period is performed as the cooking is actually carried out in the microwave oven.

Hereinafter, the processes of displaying the selected menus in the microwave oven according to the first embodiment of the present invention will be explained together with the manipulating processes performed by the user.

Figure 6:
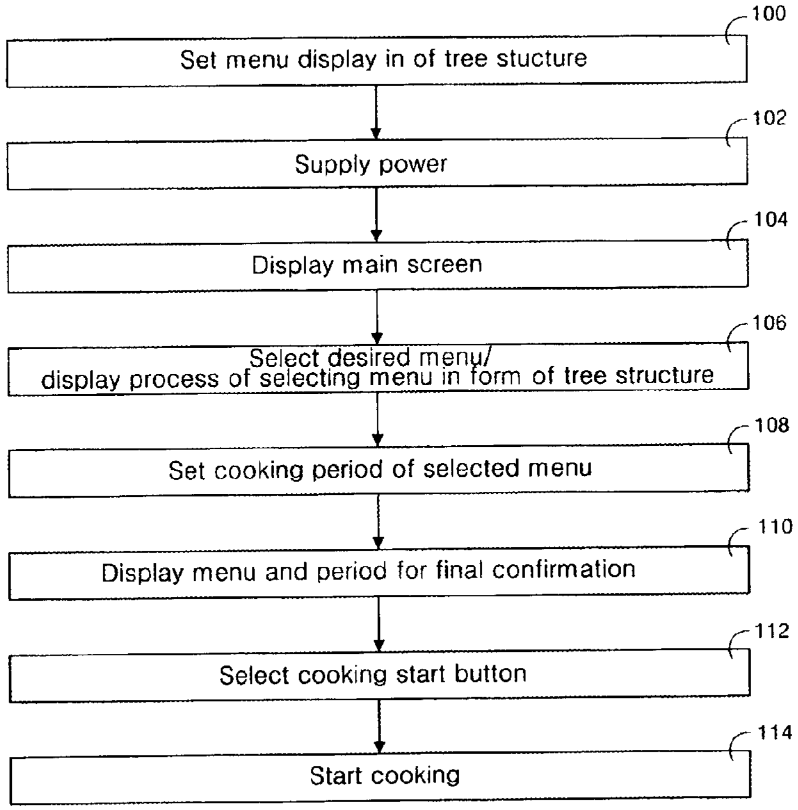
FIG. 6 is a flowchart illustrating the operating procedure for the menu display in the microwave oven according to the first embodiment of the present invention.

FIG. 6 is a flowchart illustrating the operating procedure according to the first embodiment of the present invention.

First, data are created and stored in the storage device 42 so that a plurality of the menus can be displayed onto the one screen in the form of small display windows whenever the various menus provided in the microwave oven are selected (step 100). This process should be performed in advance before shipping the products of the microwave oven.

Then, when the power is supplied to the microwave oven, the predetermined initial screen is retrieved from the storage device 42 and displayed onto the display unit 40 under the control of the microcomputer 30 (step 102).

In step 102, the main screen, which is for example shown in the first stage of FIG. 5 and used for selecting the menus of the microwave oven, is displayed onto the display unit 40 when the user has selected a predetermined button. The selection of the button is made through the key input circuit 44. If the user selects the button through the key input circuit 44, a signal corresponding to the selected button is inputted into the microcomputer 30. The microcomputer 30 decodes the inputted signal, and accordingly, it retrieves the predetermined main screen from the storage device 42 and allows the main screen to be displayed onto the display unit 40. Through the above process, the state shown in the first stage of FIG. 5 is displayed onto the display unit 40 (step 104).

Then, if the user selects a desired menu on the screen displayed in step 104, the lower functions included in the selected menu are displayed in the form of the tree structure, and the other higher menus are also displayed onto the same screen. That is, it is displayed in the same state as the second stage of FIG. 5.

At this time, it is difficult to display all the menus onto the one screen. The reason is that there is a limitation on a screen size and the number of menus to be displayed is large. Thus, there may be some menus which cannot be displayed onto the current display screen. However, the predetermined dial key can be used so that these menus are displayed onto the screen.

Of course, the signal selected by the user during the process is transmitted to the microcomputer 30. Then, the microcomputer 30 decodes the received signal and allows the menu corresponding to the signal to be displayed onto the display unit 40 in the form of the tree structure. The microcomputer 30 controls the menu display in the following manner. That is, if the lower functions are included in the selected menus, they are displayed in the form of the tree structure together with the selected higher menus. Further, in case of unselected menus, only the highest menus or functions thereof are included in the tree structure displayed onto the display unit 40. Until a menu the user finally wishes has been selected according to the above process, the microcomputer 30 causes the menu selection processes to be sequentially displayed based on the data which are used to control the menu display in the form of the tree structure and stored in the storage device 42 (step 106).

If the menu selection has been completed according to the processes up to step 106, a screen used for setting the cooking period of time is displayed onto the display unit 40 together with the finally selected menu, as shown in the third stage of FIG. 5 (step 108). That is, when it has been confirmed that the desired menu has been finally selected during the menu selection process in the form of the tree structure, the screen used for setting the cooking period is displayed together with the selected menu under the control of the microcomputer 30.

Further, when the user has inputted the cooking period through the screen provided in step 108, the finally selected menu and the inputted cooking period are displayed onto the same screen so that the user can confirm these matters (step 110).

Thereafter, the user confirms the cooking period and the selected menu through step 110 and selects a button for allowing the microwave oven to be operated (step 112). An operating signal selected by the user in step 112 is transmitted to-the microcomputer 30. The microcomputer 30 outputs the operating signal to the relay control unit 38 so that the cooking corresponding to the signal inputted by the user can be performed.

Accordingly, the cooking to be made in step 114 can be started. The cooking to be made in step 114 is sequentially performed under the control of the microcomputer 30 during the determined period of time and according to the cooking algorithm corresponding to the selected menu. Further, in order to notify the user that the selected cooking is being performed, the cooking period is displayed while counted down, as shown in the last stage of FIG. 5.

According to the first embodiment of the present invention described above, the cooking menus the user has selected and additional lower functions thereof are displayed onto the single display screen of the microwave oven so that the user can easily recognize them at one time. In particular, according to the first embodiment of the present invention, the menus of the microwave oven are displayed in the form of the tree structure.

That is, only all the higher functions are displayed onto the initial screen of the microwave oven. If any one of the higher functions is selected, all the lower functions included in the selected higher function are displayed. In such a case, the lower functions of the unselected higher functions are not displayed. However, all the higher functions and the lower functions included in the selected higher function are displayed on the one screen.

At this time, in order to assist the user with his/her easy discrimination of the higher menus, the selected and unselected higher functions are displayed in a state where signs of function indicators thereof are different from one another. For example, the higher function having lower functions is displayed such that a "+" sign is included in its function indicator (rectangular box symbol). Thus, if the higher function with the "+" sign marked in its function indicator is selected, the function indicator of the higher function is displayed as including a "–" sign therein in order to notify the user that the lower functions of the selected higher function are displayed. Further, the higher function which does not include the lower functions may have any empty function indicator (rectangular box symbol) so as to notify the user that the higher function does not include any lower functions.

Next, processes of controlling the menu display in the microwave oven according to a second embodiment of the present invention will be explained.

The processes of controlling the menu display in the microwave oven according to a second embodiment of the present invention are to control the display of the selected menus by allowing a plurality of display windows to be displayed onto the same screen. Thus, data stored in the storage device 42 are controlled such that the various cooking menus provided in the microwave oven can be displayed through a window function. That is, the data stored in the storage device are controlled in such a manner that one of the cooking menus is displayed onto a single screen as one display window on which another cooking menu can be in turn displayed as another display window.

Figure 7:
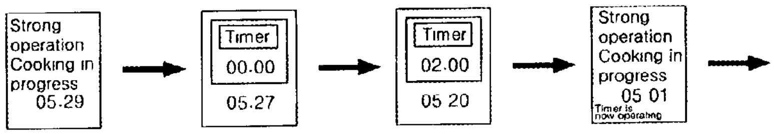
FIG. 7 is a view showing an operating procedure of the menu display in the microwave oven according to a second embodiment of the present invention.
Figure 8:
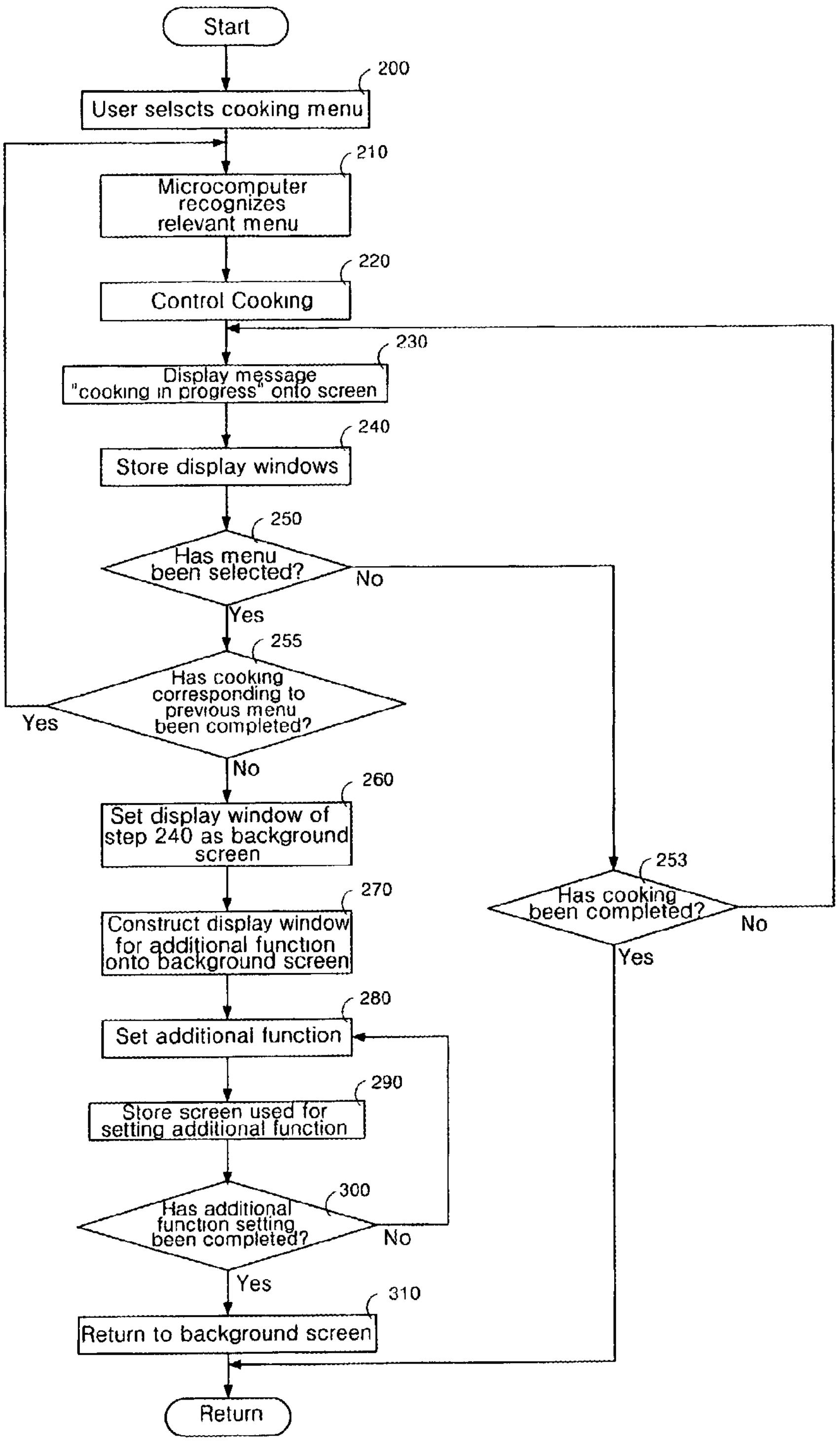
FIG. 8 is a flowchart illustrating the operating procedure for the menu display in the microwave oven according to the second embodiment of the present invention.

FIG. 7 is a view showing the sequential display states of the display unit 40 made when another menu has been selected while the cooking corresponding to any arbitrary menu is in progress, and FIG. 8 is a flowchart illustrating the operating procedure relevant thereto.

If the user selects any menu keys provided for displaying the cooking menus of the microwave oven through the key input circuit 40 while the power is being supplied (step 200), the signal corresponding to the selected menu is inputted into the microcomputer 30 (step 210).

The microcomputer 30 receives and recognizes a signal for the cooking selection of the user, and outputs the control signal to the relay control unit 38 such that the selected cooking can be performed according to the relevant cooking algorithm stored in the storage device 42 (step 220).

The relay control unit 38 turns on a main relay for operating the magnetron and/or the heater of the microwave oven and a fan motor relay for operating the fan motor according to the control signal of the microcomputer 30. Thus, the cooking menu selected by the user will be performed in the microwave oven.

Furthermore, the microcomputer 30 controls the display of a notification signal for notifying the user of the currently performed cooking onto the display unit 40 (step 230). The display at this time is made by using only one display window. Further, information displayed in the display window (a first display state in FIG. 7) is stored in a recordable region of the storage device 42 (step 240).

If any other cooking menus are not selected until the cooking according to the menu selected in step 200 is completed after the procedure has proceeded up to step 240, the display state of step 230 is maintained onto the display unit 40 (step 253).

However, if other additional functions are selected before the selected cooking is completed after the procedure has proceeded up to step 240 (steps 250 and 255), the microcomputer 30 causes the display window of a first stage of FIG. 7 to be displayed as a background screen (step 260). Then, another display window corresponding to the selected additional function is also displayed onto the background screen. The display state at this time is shown in a second stage of FIG. 7 (step 270).

The menu corresponding to the additional function selected in step 250 is limited to a menu which does not interfere with the currently performed cooking selected in step 200. For example, the additional function includes hood fan operation, lamp operation, and the like.

If another display window for the additional function is displayed onto the background screen in step 270 and an operation setting needed for performing the additional function is completed, the microcomputer 30 stores the display window for the additional function set in step 280 into the storage device 42 (step 290).

Thereafter, the user confirms the screen in which the additional function setting is completed, as shown in a third stage of FIG. 7 (step 300). If the additional function setting is completed, the display unit 40 is returned to the initial background screen (step 310). Of course, information that the operation according to the additional function is in progress is also displayed onto the background screen returned in step 310.

According to the second embodiment of the present invention described above, the background screen for displaying the main functions of the microwave oven is created onto the display screen and then is stored. Further, the small display windows for displaying the additional functions of the microwave oven are created and displayed onto the background screen used for showing the main functions.

That is, when operating auxiliary parts such as fan, lamp and timer in a state where the main function of the microwave oven, i.e. cooking function, is being performed, the window function is implemented into the display unit 40 so that the user can easily set, confirm and recognize the additional functions even during the operation of the main function. Thus, the user can confirm the operating state of the microwave oven on one screen at one time and recognize that he/she has selected the additional functions such as the operations of the timer and fan of the microwave oven.

Although the display state of the display unit 40 has been described as an operating relationship between the main and additional functions, the present invention is not limited thereto. The feature of the present invention is that the display state of the display unit 40 can be expressed through a plurality of display windows. Further, the present invention is characterized in that the plurality of display windows are controlled to be displayed onto only one screen.

As described above, according to the device and method for controlling the menu display of the microwave oven of the present invention, the additional display windows used for setting the other additional functions can be formed in a state where the display window for the arbitrary menu appears on the display unit. Thus, numerous menus can be displayed onto only one screen. Accordingly, since the main display window and the additional display windows can be displayed onto the background screen, there is an advantage in that the user can certainly recognize that the additional functions are being set during the process of the main function.

Further, according to the other embodiment of the present invention, the cooking menus selected by the user and the other various menus are displayed on the same display screen in the form of the tree structure, so that the user can recognize a plurality of the menus of the microwave oven at one time.

According to the present invention having the above menu display control, since the user can confirm the various functions of the microwave oven on the same screen at one time, there is another advantage in that trials and errors made when using the microwave oven can be minimized. In addition, since all the functions can be confirmed simultaneously, there are further advantages in that the time required for learning how to use the microwave oven is reduced and function selection can be conveniently made.

What is claimed is:

1. A method for controlling display of a microwave oven, comprising:

displaying a window containing a plurality of menu selections for cooking on a display unit of the microwave oven;

selecting at least one of the menu selections for cooking;

displaying a window containing cooking information for the selected cooking, and performing the selected cooking corresponding to the selected menu selection; and selecting another menu selection for another function before the selected cooking is complete, wherein during the selection of the another menu selection, the window containing the cooking information of the selected cooking menu is displayed in the background, while the window containing the another menu selection is displayed in the foreground.

2. The method as claimed in claim 1, wherein the another function is one which does not interfere with the selected cooking step.

3. The method of claim 2, wherein the another function includes at least one of a hood fan operation or a lamp operation.

* * * * *